No. 880,459. PATENTED FEB. 25, 1908.
H. W. MORRIS.
FEED BAG.
APPLICATION FILED AUG. 22, 1907.
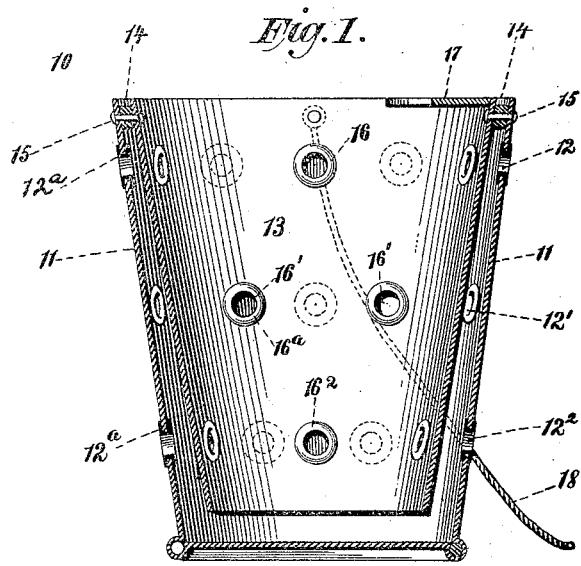
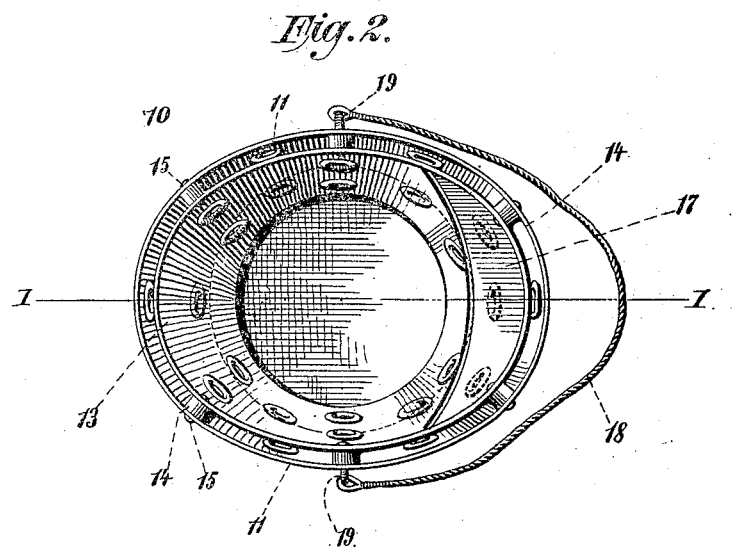

UNITED STATES PATENT OFFICE.

HERBERT W. MORRIS, OF NEW YORK, N. Y.

FEED-BAG.

No. 880,459.

Specification of Letters Patent.

Patented Feb. 25, 1908.

Application filed August 22, 1907. Serial No. 389,610.

*To all whom it may concern:*

Be it known that I, HERBERT W. MORRIS, a subject of the King of Great Britain, residing at the city of New York, borough of Manhattan, in the county and State of New York, have invented certain new and useful Improvements in Feed-Bags, of which the following is a full, clear, and exact specification.

My invention relates to improvements in portable feed holders or receptacles adapted to be attached to the heads of horses and other animals, and the same has for its object more particularly to provide a simple, efficient and inexpensive feed bag which may be readily attached to a horse's head and enable the horse to obtain all the feed disposed therein without being obliged to toss the bag about.

Further, said invention has for its object to provide a feed bag composed of a plurality of sections appropriately secured together and provided with air vents which are so arranged as to permit air to enter the bag freely, but prevent the feed dropping out of the bag.

Further, said invention has for its object to provide a feed bag which will not permit the feed to drop out of the same when the horse raises his head.

To the attainment of the aforesaid objects and ends my invention consists in the novel details of construction, and in the combination, connection and arrangement of parts hereinafter more fully described, and then pointed out in the claims.

In the accompanying drawings forming part of this specification wherein like numerals of reference indicate like parts, Figure 1 is a sectional view taken on the line 1—1 of Fig. 2, showing one form of a feed bag made according to, and embodying my said invention, and Fig. 2 is a top view of a complete bag.

In said drawings 10 designates the bag as a whole comprising an outer bag 11 having slightly tapered sides provided with three rows of apertures 12, $12^1$, $12^2$, arranged one above the other; the apertures of each row spaced equally apart and provided with eyelets $12^a$. The apertures of the three rows, however, are arranged in a staggered formation, *i. e.* the apertures of one row being placed opposite a point midway of the distance between two apertures in each of the adjacent rows.

13 denotes an inner bag or tubular section which is made smaller than the outer bag, and has its sides more tapered than the outer bag. The upper edge of said inner bag 13 is secured to the upper edge of the outer bag and maintained properly separated therefrom by means of studs 14, 14 and rivets 15, 15 extending through said studs, and the inner and outer bags. The bottom of the inner bag 13 is open and arranged a short distance above the bottom of said outer bag. The inner bag 13 is also provided with three rows of apertures 16, $16^1$, $16^2$, arranged in the same manner as the outer bag, and provided with eyelets $16^a$.

The inner bag is so arranged relatively to the outer bag that the rows of apertures therein shall be in the same horizontal planes with the corresponding rows of apertures in the outer bag, and the individual apertures in each row of the inner bag located intermediate the apertures in the outer bag. However, the size of the eyelets 16, 16' $16^2$ in the inner bag, and also the eyelets 12, 12', $12^2$ in the outer bag, as shown in the accompanying drawing, is out of proportion to the size of the bag. In actual construction and as proportioned in a full sized feed bag these apertures are relatively small in order to prevent any material amount of the grain passing through the same in either the inner or outer bag.

17 denotes a crescent-shaped retaining section or flap which is secured along its outer edge to the inner upper edge of the inner bag 13, and 18 denotes a rope or band having its ends secured to eyes 19, 19 arranged upon two oppositely located rivets 15, 15.

The operation of the bag is as follows: The feed is disposed in the inner bag 13, and the entire bag then fastened to the horse's head, with the crescent-shaped flap 17 under the horse's jaw. Air will be admitted to the interior of the bag through the space between the inner and outer bags, and the apertures 12, $12^1$, $12^2$, 16, $16^1$, $16^2$ therein. Any feed which may pass through the apertures 12, $12^1$, $12^2$ in the inner bag, owing to the shaking or tossing of the bag by the horse, will at once fall between the inner and outer bags to bottom of the outer bag and become again accessible to the horse. Should the horse throw up its head the feed in the inner bag will be restrained and prevented from falling out by the crescent-shaped flap 17, the inner edge of which bears closely against the underside of the horse's head, and as soon as its head is again lowered the feed will drop to the bottom of the inner bag.

Having thus described my said invention what I claim and desire to secure by Letters Patent is:—

1. A feed bag comprising an outer bag having apertures therein, an inner bag open at its base, secured along its upper edge to said outer bag, and provided with apertures arranged intermediate the apertures in the outer bag, substantially as specified.

2. A feed bag comprising a bag having a plurality of circumferential rows of apertures therein, an inner tubular section supported at its upper edge along the upper edge of said bag at a distance therefrom, and provided with a plurality of circumferential rows of apertures, substantially as specified.

3. A feed bag comprising a bag having a plurality of circumferential rows of apertures therein, and a series of studs upon its inner surface along its upper edge, a tapered, tubular section of smaller diameter than said bag secured along its upper edge to the studs on said bag, and provided with a plurality of circumferential apertures arranged in the same horizontal plane with the rows of apertures in said bag; the apertures in said tubular section being arranged intermediate the apertures in said bag, substantially as specified.

4. A feed bag comprising an outer bag having apertures therein, a tubular, apertured section secured along its upper edge to the upper edge of said bag, and a retaining section secured to said tubular section along a portion of its upper edge, substantially as specified.

5. A feed bag comprising a bag having apertures in the side thereof, a tubular section of smaller outline than said bag secured thereto along its upper edge and provided with apertures in its side, and a crescent-shaped retaining section secured along one of its edges to the upper edge of said tubular section, substantially as specified.

6. A feed bag comprising a bag having a plurality of circumferential rows of apertures therein, an inner tubular section supported at its upper edge along the upper edge of said bag at a distance inwardly therefrom, and provided with a plurality of circumferential rows of apertures and a retaining section secured to said inner tubular section along a portion of its upper edge, substantially as specified.

7. A feed bag comprising a bag having a plurality of circumferential rows of apertures therein, and a series of studs upon its inner surface along its upper edge, a tapered, tubular section of smaller outline than said bag secured at its upper edges to the studs on said bag and provided with a plurality of circumferential rows of apertures, and a crescent-shaped retaining section secured at one of its edges to said inner tubular section along a portion of its upper edge, substantially as specified.

Signed at the city of New York in the county and State of New York, this sixteenth day of August, 1907.

HERBERT W. MORRIS.

Witnesses:
  CONRAD A. DIETERICH,
  LOUIS B. HASBROUCK.